United States Patent
Yano

(10) Patent No.: US 8,923,554 B2
(45) Date of Patent: Dec. 30, 2014

(54) INFORMATION PROCESSING DEVICE, RECOGNITION METHOD THEREOF AND NON-TRANSITORY COMPUTER-READABLE STORAGE MEDIUM

(75) Inventor: Kotaro Yano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 13/224,026

(22) Filed: Sep. 1, 2011

(65) Prior Publication Data

US 2012/0063639 A1 Mar. 15, 2012

(30) Foreign Application Priority Data

Sep. 9, 2010 (JP) ................................. 2010-202408

(51) Int. Cl.
| | | |
|---|---|---|
| G06K 9/00 | (2006.01) | |
| G06K 9/34 | (2006.01) | |
| G06K 9/46 | (2006.01) | |
| G06K 9/32 | (2006.01) | |
| G06K 9/62 | (2006.01) | |

(52) U.S. Cl.
CPC ...... *G06K 9/4642* (2013.01); *G06K 2009/6213* (2013.01); *G06K 9/3233* (2013.01)
USPC .......................................... 382/103; 382/173

(58) Field of Classification Search
None
See application file for complete search history.

(56) References Cited

U.S. PATENT DOCUMENTS

| | | | |
|---|---|---|---|
| 6,819,796 B2 | 11/2004 | Hong et al. | |
| 7,423,658 B1 * | 9/2008 | Uomori et al. | 345/660 |
| 7,699,423 B2 | 4/2010 | Suwa et al. | |
| 2009/0315996 A1 * | 12/2009 | Guler et al. | 348/169 |
| 2010/0290668 A1 * | 11/2010 | Friedman et al. | 382/103 |

FOREIGN PATENT DOCUMENTS

| | | |
|---|---|---|
| JP | 2001-229390 A | 8/2001 |
| JP | 2010-170202 A | 8/2010 |

OTHER PUBLICATIONS

Viola, et al., "Rapid Object Detection using Boosted Cascade of Simple Features", Proceedings of the IEEE Conference on Computer Vision and Pattern Recognition (CVPR2001).
Dalal, et al., "Histograms of Oriented Gradients for Human Detection", Proceedings of the IEEE Conference on Computer Vision and Pattern Recognition (CVPR2005).
Zhu, et al., "Fast human detection using a cascade of Histograms of Oriented Gradients", Proceedings of the IEEE Conference on Computer Vision and Pattern Recognition (CVPR2006).
Stauffer, et al., "Adaptive background mixture models for real-time tracking", Proceedings of the IEEE Conference on Computer Vision and Pattern Recognition (CVPR1999).
U.S. Appl. No. 13/267,455, filed Oct. 6, 2011, Applicant: Kotaro Yano.
Japanese Office Action dated May 2, 2014 in Japanese Application No. 2010-202408.

(Continued)

*Primary Examiner* — Bhavesh Mehta
*Assistant Examiner* — David F Dunphy
(74) *Attorney, Agent, or Firm* — Fitzpatrick, Cella, Harper & Scinto

(57) ABSTRACT

An information processing device detects a background region from an image, extracts multiple partial regions from the image, sets multiple local regions for each of the multiple partial regions, selects a local region including a region other than the background region from among the multiple local regions and calculates a local feature amount from the selected local region, and determines a partial region that includes a recognition target object from among the multiple partial regions based on the calculated local feature amount.

14 Claims, 5 Drawing Sheets

(56) References Cited

OTHER PUBLICATIONS

H. Fujiyoshi, "Gradient-Based Feature Extraction -SIFT and HOG-", IEICE Technical Report PRMU2007-48-89, [Pattern Recognition / Media Understanding], The Institute of Electronics, Information and Communication Engineers, vol. 107, No. 206. pp. 211-224 (Aug. 27, 2007).

A. Stein, et al. "Incorporating Background Invariance into Feature-Based Object Recognition". Proceedings of the Seventh IEEE Workshop on Applications of Computer Vision (WACV/MOTION'05), pp. 37-44 (2005).

* cited by examiner

INFORMATION PROCESSING DEVICE, RECOGNITION METHOD THEREOF AND NON-TRANSITORY COMPUTER-READABLE STORAGE MEDIUM

BACKGROUND OF THE INVENTION

1. Field of the Invention

The present invention relates to information processing devices, recognition methods thereof, and non-transitory computer-readable storage media.

2. Description of the Related Art

In recent years, functions for tracking objects by detecting a face of a person in an image during capture have spread rapidly in digital still cameras and camcorders. These face detection and tracking functions are extremely useful technologies for automatically adapting the focus and exposure of a capture-target object. The practical applications of technologies for detecting a face in an image are advancing using techniques such as those proposed in Viola and Jones, "Rapid Object Detection using Boosted Cascade of Simple Features," Proceedings of the IEEE Conference on Computer Vision and Pattern Recognition (CVPR2001), (hereinafter referred to as Document 1).

On the other hand, there is a desire to use surveillance cameras in such areas as intrusion detection, movement and congestion surveillance, and the like by recognizing the faces of persons of course, and also by recognizing persons in situations where the face is not visible. Techniques for detecting human forms in images have been proposed in relation to such technologies. For example, Dalal and Triggs, "Histograms of Oriented Gradients for Human Detection," Proceedings of the IEEE Conference on Computer Vision and Pattern Recognition (CVPR2005), (hereinafter referred to as Document 2), discusses techniques in which histograms of oriented gradients of pixel values are extracted from images to determine whether or not a partial region within an image is a person using the histogram as a feature amount (HOG feature amount). That is, the contours of a human form are expressed by feature amounts in the orientation of gradients of pixel values, and these are used in recognition. Furthermore, in Qiang Zhu et al, "Fast human detection using a cascade of Histograms of Oriented Gradients," Proceedings of the IEEE Conference on Computer Vision and Pattern Recognition (CVPR2006), (hereinafter referred to as Document 3), a method is proposed in which AdaBoost learning proposed in Document 1 is carried out using HOG feature amounts as weak classifiers, and by executing cascade type identifiers based on this, human forms are detected rapidly.

However, in the above conventional techniques aimed at detecting human forms, in a case where complicated edges are included in the background, the recognition accuracy deteriorates. This is because background edge features are also mixed in and simultaneously captured when capturing features of contour portions of a person, and thus features of human region portions cannot be separated and captured alone.

Furthermore, in the conventional examples, recognition is carried out by learning features of local regions effective in recognition using samples of person images and nonperson images. At this time, many samples of different positions, sizes, and postures of persons in images are used in learning, and different contour positions for each sample are assimilated by learning. Therefore, feature amounts of local regions ineffective for specific human images are also used in recognition.

In this way, in a case where complicated edges of background portions are included in local regions, the recognition accuracy deteriorates. This kind of phenomenon is a common issue that occurs in cases where recognition is carried out using features of contour portions of objects.

SUMMARY OF THE INVENTION

The present invention provides a technology in which recognition can be carried out with higher accuracy than a conventional configuration even in a case of a complicated background.

According to a first aspect of the present invention, there is provided an information processing device, comprising: a detection unit configured to detect a background region from the image, a region extraction unit configured to extract multiple partial regions from the image, a setting unit configured to set multiple local regions for each of the multiple partial regions, a calculation unit configured to select a local region including a region other than the background region from among the multiple local regions, and calculate a local feature amount from the selected local region, and a recognition unit configured to determine a partial region that includes a recognition target object from among the multiple partial regions based on the calculated local feature amount.

According to a second aspect of the present invention, there is provided an information processing device, comprising: a detection unit configured to detect a background region from an image, a region extraction unit configured to extract multiple partial regions from the image, a replacement unit configured to perform a replacement process in which a pixel value of pixels positioned in the background region within the partial regions is replaced with a predetermined value, a calculation unit configured to calculate a local feature amount from multiple local regions that have been set in the partial regions after the replacement process, and a recognition unit configured to determine a partial region that includes a recognition target object from among the multiple partial regions based on the calculated local feature amount.

According to a third aspect of the present invention, there is provided a recognition method in an information processing device, comprising: detecting a background region from the image, extracting multiple partial regions from the image, setting multiple local regions for each of the multiple partial regions, selecting a local region including a region other than the background region from among the multiple local regions, and calculating a local feature amount from the selected local region, and determining a partial region that includes a recognition target object from among the multiple partial regions based on the calculated local feature amount.

According to a fourth aspect of the present invention, there is provided a recognition method in an information processing device, comprising: detecting a background region from an image, extracting multiple partial regions from the image, performing a replacement process in which a pixel value of pixels positioned in the background region within the partial regions is replaced with a predetermined value, calculating a local feature amount from multiple local regions that have been set in the partial regions after the replacement process, and determining a partial region that includes a recognition target object from among the multiple partial regions based on the calculated local feature amount.

According to a fifth aspect of the present invention, there is provided a non-transitory computer-readable storage medium storing a computer program for causing a computer to function as: a detection unit configured to detect a background region from the image, a region extraction unit configured to extract multiple partial regions from the image, a setting unit configured to set multiple local regions for each of the multiple partial regions, a calculation unit configured to select a local region including a region other than the background region from among the multiple local regions, and calculate a local feature amount from the selected local region, and a recognition unit configured to determine a partial region that includes a recognition target object from among the multiple partial regions based on the calculated local feature amount.

According to a sixth aspect of the present invention, there is provided a non-transitory computer-readable storage medium storing a computer program for causing a computer to function as: a detection unit configured to detect a background region from an image, a region extraction unit configured to extract multiple partial regions from the image, a replacement unit configured to perform a replacement process in which a pixel value of pixels positioned in the background region within the partial regions is replaced with a predetermined value, a calculation unit configured to calculate a local feature amount from multiple local regions that have been set in the partial regions after the replacement process, and a recognition unit configured to determine a partial region that includes a recognition target object from among the multiple partial regions based on the calculated local feature amount.

Further features of the present invention will be apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1:
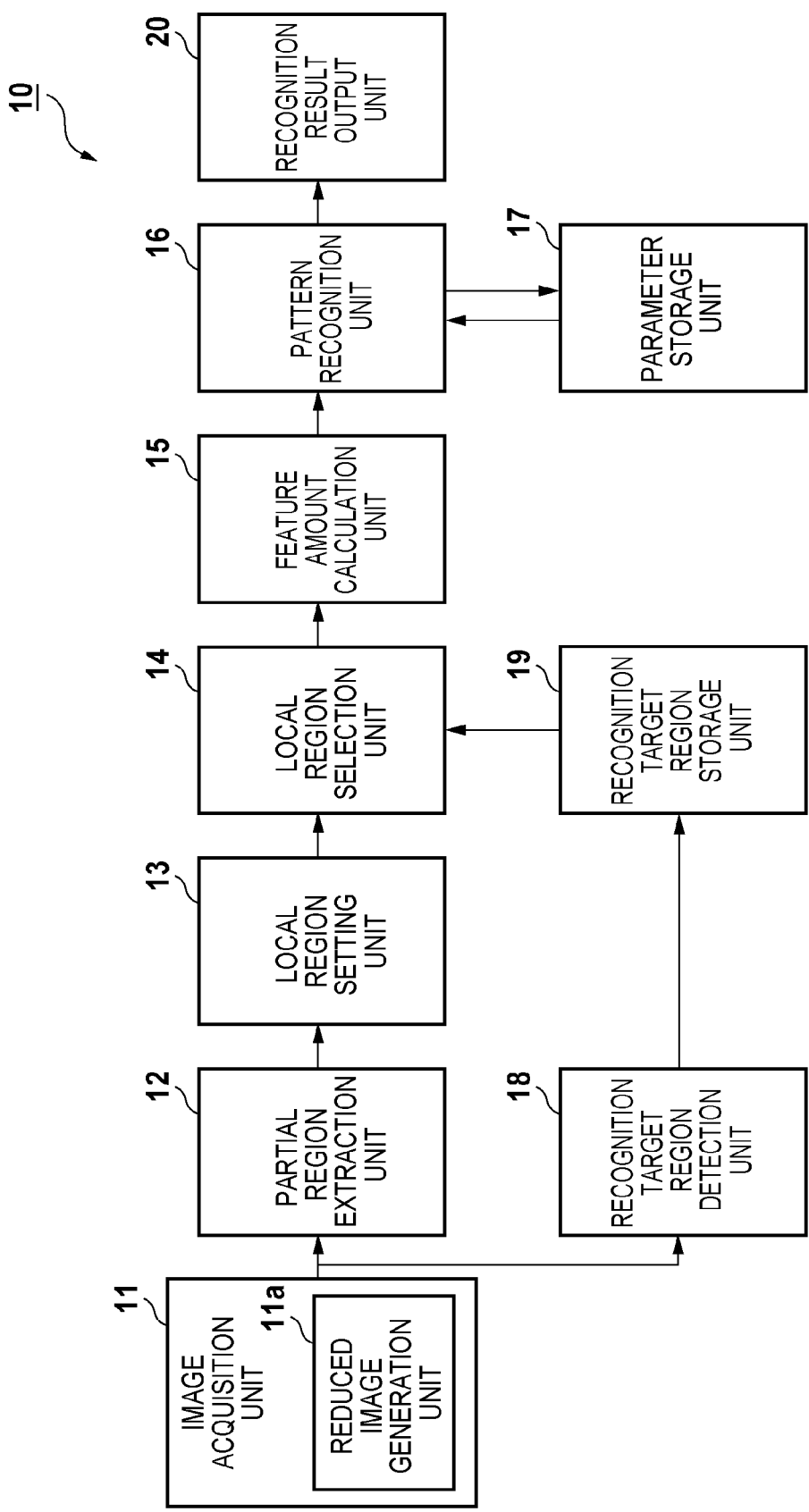
FIG. 1 is a diagram showing one example of a configuration of an information processing device 10 according to one embodiment of the present invention.

FIG. 1 is a diagram showing one example of a configuration of an information processing device 10 according to one embodiment of the present invention. It should be noted that a computer is inbuilt in the information processing device 10. The computer is equipped with a main control unit such as a CPU and storage units such as a ROM (read only memory), RAM (random access memory), and an HDD (hard disk drive). Furthermore, the computer may also be additionally equipped with an input/output unit such as buttons and a display or a touch panel, and a communications unit or the like such as a network card. It should be noted that each of these configuration units is connected by a bus or the like and is controlled according to the main control unit executing programs stored in the storage unit.

As its functional configuration, the information processing device 10 is configured equipped with an image acquisition unit 11, a partial region extraction unit 12, a local region setting unit 13, a local region selection unit 14, a feature amount calculation unit 15, a pattern recognition unit 16, a recognition result output unit 20, and a parameter storage unit 17. Furthermore, the information processing device 10 is also provided with a recognition target region detection unit 18 and a recognition target region storage unit 19.

The image acquisition unit 11 acquires images that have been captured by an image capturing apparatus (for example, a camera). A reduced image generation unit 11a is provided inside the image acquisition unit 11. The reduced image generation unit 11a reduces the acquired image to a predetermined size. For example, a reducing process is executed a predetermined number of times on the acquired image so that it becomes 0.8 times, then 0.8 times again of the reduced image, and so on. In this way, reduced images of different scaling ratios are generated. It should be noted that reduced images of different scaling ratios are generated to enable recognition of recognition targets (objects) of various sizes from the acquired images.

The recognition target region detection unit 18 detects a region of a recognition target (hereinafter referred to as object) from the image. That is, it detects a region that is other than a background region, and in which an object appears. A region of an object other than a background region may be acquired for example by generating in advance an image that does not contain an object as a background model, then comparing this background model and an image acquired by the image acquisition unit 11. Specifically, using a technique disclosed in Stauffer and Grimson, "Adaptive background mixture models for real-time tracking," Proceedings of the IEEE Conference on Computer Vision and Pattern Recognition (CVPR1999) for example, a recognition target region may be separated from the background region, and a binary image may be generated in which the recognition target region is set to "1" and background regions other than this are set to "0."

The recognition target region storage unit 19 stores the detection results detected by the recognition target region detection unit 18. In the present embodiment, a binary image in which the recognition target region is set to "1" and background regions other than that are set to "0" is stored in the recognition target region storage unit 19 as the detection result.

Figure 2A:
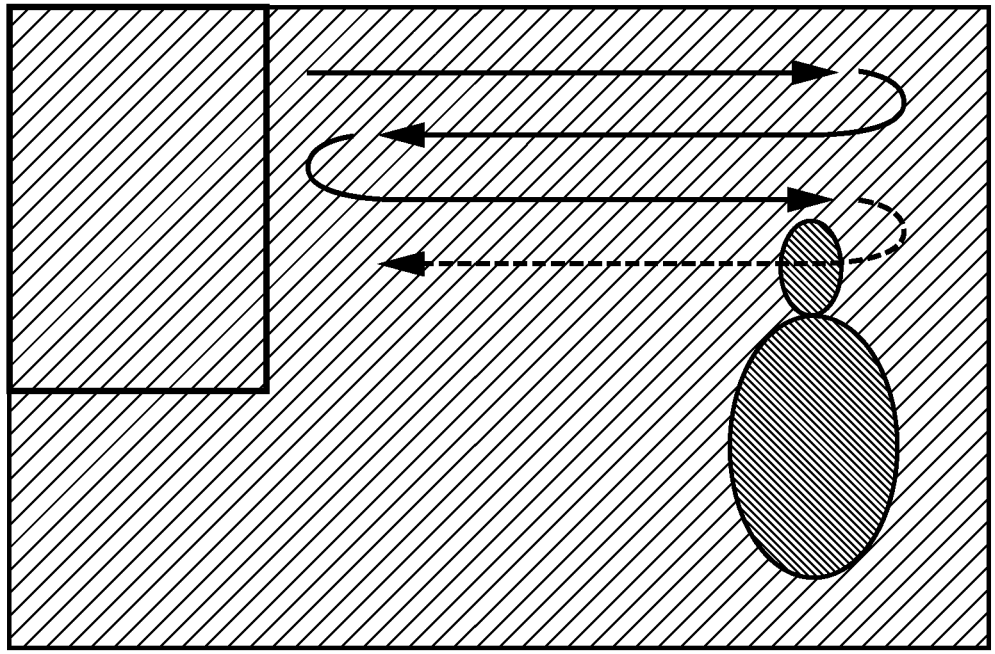
FIG. 2A and FIG. 2B are diagrams showing examples of an image including a recognition target object.

The partial region extraction unit 12 extracts (cuts out) partial regions from inside the multiple images (the acquired image and the multiple reduced images). Specifically, as shown in FIG. 2A, it cuts out partial regions of a predetermined size from each of the multiple images while shifting the cutout position (from the top left edge to the bottom right edge). This process is carried out until the number of cutout partial regions reaches a predetermined number. That is, partial regions are extracted exhaustively from the images so that recognition of objects of various scaling ratios can be performed at various positions in the image and the reduced images. For example, partial regions are cut out while shifting the cutout position so that 90% of the length and breadth of the partial regions overlap.

The local region setting unit 13 sets multiple local regions within the multiple partial regions. For example, the setting of the local regions may be carried out as proposed in Document 2 by dividing the partial regions into a predetermined number of local regions in advance.

Based on the detection results (binary images) of the recognition target region stored in the recognition target region storage unit 19, the local region selection unit 14 selects local regions as calculation targets of feature amounts from among the multiple local regions that have been set by the local region setting unit 13. In the present embodiment, selection of the local regions is carried out using a method of human detection that is proposed in Document 2. In Document 2, HOG (histogram of oriented gradients) feature amounts are calculated by dividing within partial regions to a predetermined multiple number of local regions in advance.

Figure 2B:
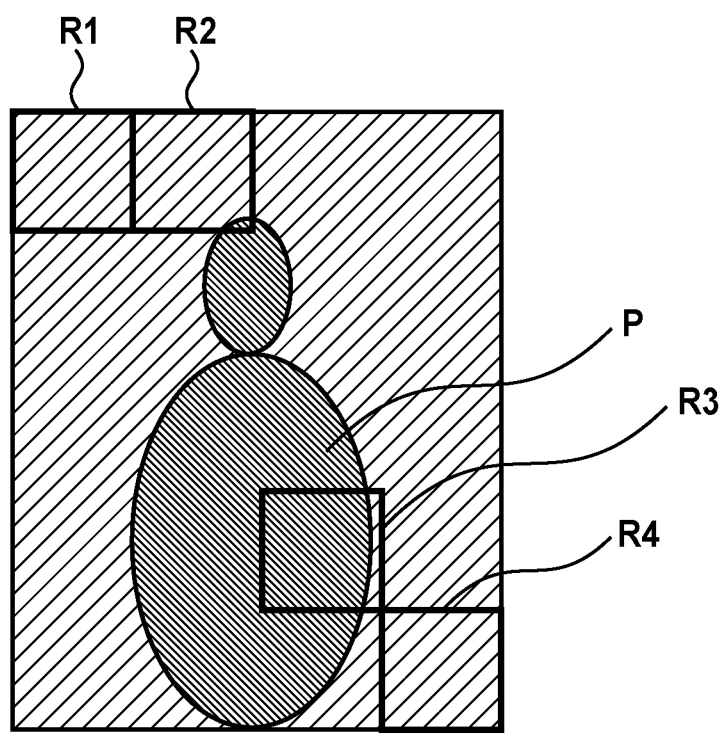

Here, description is given regarding selection of the local regions. FIG. 2B shows one example of partial regions in which four local regions (R1, R2, R3, and R4) are set. P refers to a person.

As described above, the accuracy of recognition tends to deteriorate when recognizing the person P in a case where the background region is complicated. For example, the local regions R1 and R4 are set in the background region, and settings of local regions such as these are a cause of deterioration in the recognition accuracy.

Accordingly, in the present embodiment, the detection results of the recognition target region detection unit 18, which are stored in the recognition target region storage unit 19, are referenced and selection of the local regions is carried out based on those detection results. For example, the recognition target region storage unit 19 stores binary images (detection results) in which regions of the person P are set to "1" and regions other than that are set to "0." Thus, the local region selection unit 14 references those values and selects local regions that include a value of "1." In the case of FIG. 2B, the regions R2 and R3 are selected as local regions in which feature extraction is to be carried out.

The feature amount calculation unit 15 obtains local feature amounts (feature amounts for recognizing predetermined objects) from local regions that have been selected by the local region selection unit 14. In the present embodiment, a HOG feature amount is calculated for each local region. Aside from HOG feature amounts, local feature amounts may use feature amounts of luminance, color, or edge intensity or the like, or may use a combination of any of these with a HOG feature amount.

Weighted coefficients corresponding to the local regions and thresholds for carrying out object determinations are stored as parameters in the parameter storage unit 17. More specifically, parameters obtained by learning using SVMs (support vector machines) as proposed in Document 2 are stored in the parameter storage unit 17. That is, parameters that have been learned using local feature amounts calculated based on detection results of recognition target regions for learning samples (supervisory samples) are stored in the parameter storage unit 17.

The pattern recognition unit 16 executes pattern recognition using the local feature amounts obtained by the feature amount calculation unit 15 and the parameters stored in the parameter storage unit 17, and determines whether or not the partial regions that have been cut out by the partial region extraction unit 12 are objects of the recognition target. The pattern recognition of the pattern recognition unit 16 is carried out by performing a product-sum calculation on the local feature amount of each local region obtained by the feature amount calculation unit 15 and the corresponding weighted coefficient thereof, and comparing the calculation result and the parameter (threshold) stored in the parameter storage unit 17.

The recognition result output unit 20 outputs the recognition result of the pattern recognition unit 16. For example, it displays on a display or prints from a printer so that a partial region determined to be a predetermined object by the pattern recognition unit 16 can be differentiated from other image regions.

Figure 3:
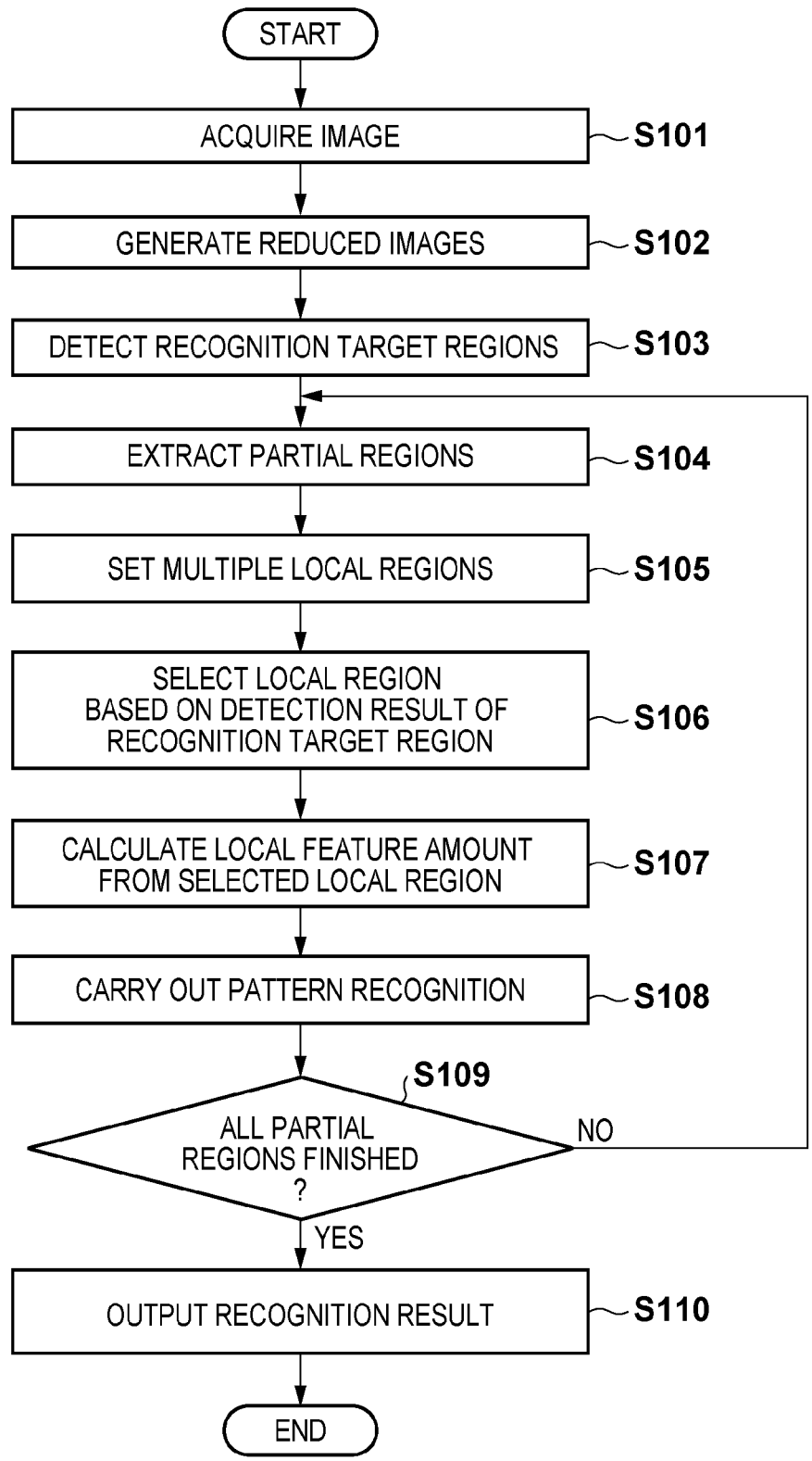
FIG. 3 is a flowchart showing one example of a flow of processing of the information processing device 10 shown in FIG. 1.

Next, description is given using FIG. 3 regarding one example of a flow of processing (recognition method) in the information processing device 10 shown in FIG. 1.

The information processing device 10 first acquires with the image acquisition unit 11 an image from an image capturing apparatus (a camera or the like). A memory or the like is provided inside the image acquisition unit 11, and the acquired image is stored in this memory (S101). Here, the image acquisition unit 11 uses the reduced image generation unit 11a to generate from the image reduced images of different scaling ratios (S102). The reduced image is stored in the memory of the image acquisition unit 11. As described earlier, reduced images of different scaling ratios are generated to enable recognition of objects of various sizes from the image acquired at S101.

The information processing device 10 uses the recognition target region detection unit 18 to detect a recognition target region (a region that is other than the background region, and where the recognition target (for example, an object) appears) from the image acquired by the image acquisition unit 11. The detection result is stored in the recognition target region storage unit 19 (S103). As described earlier, a binary image in which the recognition target region is set to "1" and background regions other than that are set to "0" is stored in the recognition target region storage unit 19 as the detection result.

Next, the information processing device 10 uses the partial region extraction unit 12 to cut out partial regions from the image (S104). More specifically, it extracts partial regions of predetermined sizes from the image and the multiple reduced images from the top left corner to the bottom right corner while shifting the positions until a predetermined number is reached.

Here, the information processing device 10 uses the local region setting unit 13 to divide the partial regions into multiple local regions (S105), and uses the local region selection unit 14 to select local regions to be calculation targets of feature amounts from among the multiple local regions (S106). As described earlier, the selection of the local regions is carried out based on the detection results of the recognition target region detection unit 18. When selection of the local regions is finished, the information processing device 10 uses the feature amount calculation unit 15 to calculate the feature amounts of the selected local regions (S107).

After this, the information processing device 10 uses the pattern recognition unit 16 to determine whether or not the partial regions that have been extracted by the partial region extraction unit 12 include a recognition target object based on the calculated local feature amounts and the parameters stored in the parameter storage unit 17 (S108). The processing from S104 to S108 is carried out repetitively for each partial region of the image. That is, the processing from S104 to S108 is carried out on all the partial regions ("NO" at S109).

When the aforementioned processing is carried out on all the partial regions ("YES" at S109), the information processing device 10 uses the recognition result output unit 20 to output the recognition results of the pattern recognition unit 16 (S110). At this time, in a case where there are multiple partial regions recognized as persons from within the image, the partial region having the highest value as recognition result (that is, having the largest calculation result of the pattern recognition unit 16) may be outputted.

According to the present embodiment, as described above, recognition target regions are detected from within an image using background models, then a local region is selected from among multiple local regions based on the detection result thereof, and pattern recognition is carried out using local feature amounts calculated from the selected local region.

For this reason, when capturing a feature of a contour portion of a recognition target object, the mixing of edge features of the background is suppressed, and therefore the features of the object alone can be separated and captured. In this way, even in the case of a complicated background, the influence thereof can be suppressed, and therefore recognition can be carried out with higher accuracy than a conventional configuration.

Embodiment 2

Next, description is given of Embodiment 2. In Embodiment 2, based on the detection results of the recognition target region detection unit 18, a feature (pixel value) of the background region is replaced with a predetermined value and nullified. In this way, description is given regarding a case where the same effect as Embodiment 1 can be obtained.

Figure 4:
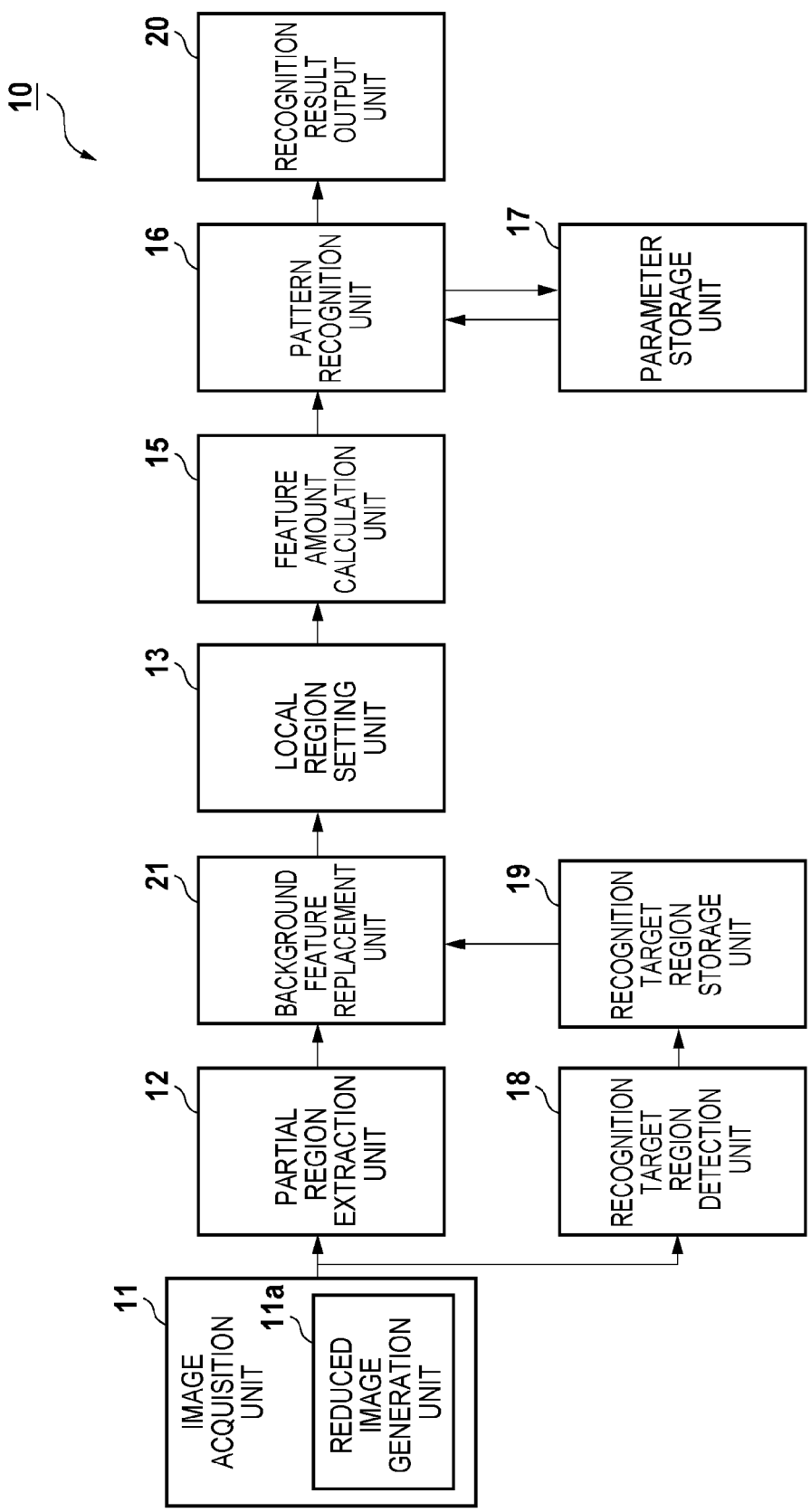
FIG. 4 is a diagram showing one example of a configuration of an information processing device 10 according to Embodiment 2.

FIG. 4 is a diagram showing one example of a configuration of an information processing device 10 according to Embodiment 2. It should be noted that same reference symbols are assigned to configurations that fulfill same functions as in FIG. 1 illustrating Embodiment 1, and description thereof is omitted.

In Embodiment 2, a background feature replacement unit 21 is provided instead of the local region selection unit 14 shown in FIG. 1 illustrating Embodiment 1.

The background feature replacement unit 21 nullifies background features within the partial regions. Specifically, it references detection results stored in the recognition target region storage unit 19 and performs nullification by replacing pixel values of pixels in positions where the detection result does not include the recognition target region with a predetermined value ("0" in the present embodiment). Due to this process, the influence of the background is weakened even in cases where the background is complicated since the pixel values of background regions are replaced with a predetermined value.

It should be noted that here description is given using an example of a case where background features are nullified by replacing all background pixel values with "0", but configurations are also possible in which nullification is carried out on each local region. For example, features of local regions that do not include the recognition target region (R1 and R4 shown in FIG. 2B) are nullified. Specifically, the background feature replacement unit 21 replaces all pixel values of local regions that do not include the recognition target region with "0".

Figure 5:
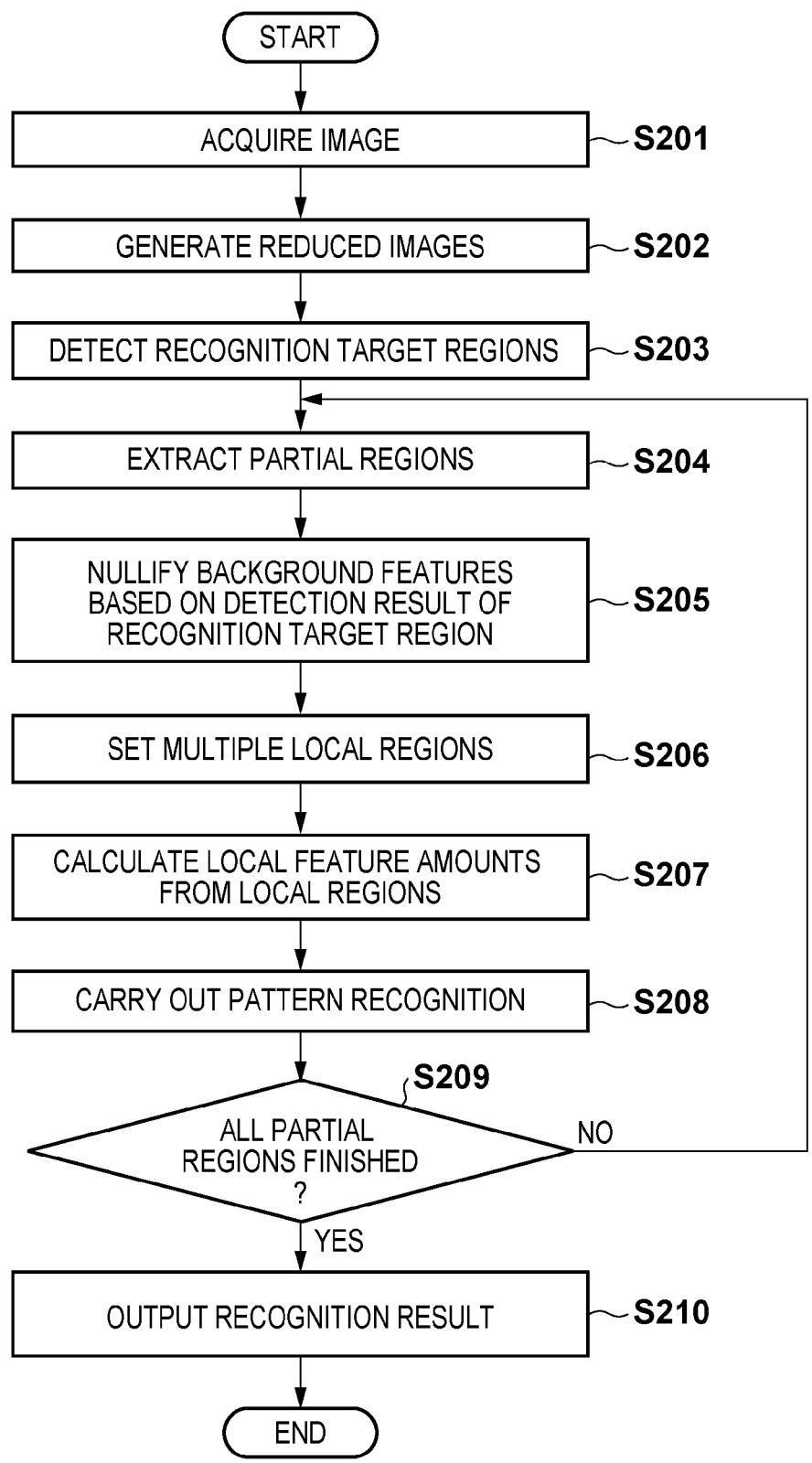
FIG. 5 is a flowchart showing one example of a flow of processing of the information processing device 10 according to Embodiment 2.

Next, description is given using FIG. 5 regarding one example of a flow of processing in the information processing device 10 according to Embodiment 2. It should be noted that the processing from S201 to S204 is identical to processing from S101 to S104 shown in FIG. 3 illustrating Embodiment 1, and therefore here description is given regarding processing of S205 onward.

When the partial regions are cut out from within the image, the information processing device 10 uses the background feature replacement unit 21 to nullify the background region features within the partial regions (S205). That is, based on the detection results of the recognition target region detection unit 18, the pixel values of the background region are replaced with a predetermined value.

Here, the information processing device 10 uses the local region setting unit 13 to divide the partial regions after this replacement process into multiple local regions (S206), and uses the feature amount calculation unit 15 to calculate feature amounts of the selected local regions (S207). It should be noted that during calculation of the feature amounts, the background region features are nullified by the process of S205, and therefore the influence thereof is weakened even for cases where the background is complicated.

After this, the information processing device 10 uses the pattern recognition unit 16 to determine whether or not the partial regions that have been extracted by the partial region extraction unit 12 include a recognition target object based on the calculated local feature amounts and the parameters stored in the parameter storage unit 17 (S208). The processing from S204 to S208 is carried out repetitively for each partial region of the image. That is, the processing from S204 to S208 is carried out on all the partial regions ("NO" at S209).

In the subsequent processing, as in Embodiment 1, when the aforementioned processing is carried out on all the partial regions ("YES" at S209), the information processing device 10 uses the recognition result output unit 20 to output the results (S210).

According to Embodiment 2, as described above, recognition target regions are detected from within an image using background models, and features of the background region are nullified based on the detection results to carry out pattern recognition. As in Embodiment 1, in this case the influence can also be suppressed even in the case of a complicated background, and therefore recognition can be carried out with higher accuracy than a conventional configuration.

The aforementioned are examples of representative embodiments of the present invention, but the present invention is not limited to the embodiments described above and shown in the drawings, and may be achieved by appropriate variations within the scope of the claims without departing from the gist thereof.

For example, the aforementioned Embodiments 1 and 2 are described in regard to a case where parameter learning is carried out according to a technique proposed in Document 2, and pattern recognition is carried out based on those parameters, but there is no limitation to this. For example, other configurations are also possible such as applying the method proposed in Document 3 and carrying out pattern recognition based on AdaBoost learning and cascade type identifiers.

Furthermore, the aforementioned Embodiments 1 and 2 are described in regard to a case where detection of recognition target regions is performed by comparing an image acquired by the image acquisition unit 11 and background models (images not including the object), and pattern recognition is carried out based on the detection results thereof, but there is no limitation to this. For example, other configurations are also possible such as obtaining a range image having range information corresponding to pixels of the image, then detecting the pixels (region) indicating comparatively close range positions within the range image as a recognition target region, and carrying out pattern recognition based on the results thereof.

Furthermore, the aforementioned Embodiments 1 and 2 are described in regard to a case where local feature amounts are calculated based on detection results of the recognition target region detection unit 18 and pattern recognition is carried out based on those calculation results, but there is no limitation to this. For example, the embodiments can be widely applied in applications or the like where features of contour portions of a recognition target object are extracted to recognize that object.

According to the present invention, as described above, recognition can be carried out with higher accuracy than a conventional configuration even in a case where the background is complicated.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-202408 filed on Sep. 9, 2010, which is hereby incorporated by reference herein in its entirety.

What is claimed is:

1. An apparatus for recognizing a target object in an image, comprising:
    a detection unit configured to detect a background region from the image including the target object,
    a region extraction unit configured to extract a partial region from the image,
    a dividing unit configured to divide the extracted partial region into multiple local regions;
    a setting unit configured to set each divided multiple local region as local regions for the partial region,
    a determination unit configured to determine whether each set local region is a candidate for the target object based on a result of detection by the detection unit,
    a selection unit configured to select a respective set local region in a case that the determination unit determines that the set local region is a candidate for the target object and not to select the set local region in a case that the determination unit determines that the set local region is not a candidate for the target object,
    a calculation unit configured to calculate a local feature amount from the selected local region in the extracted partial region, and
    a recognition unit configured to determine whether the extracted partial region including the selected local region includes the target object based on the calculated local feature amount.

2. The information processing device according to claim 1, wherein the detection unit detects the background region by comparing the image and a background model, which is an image not containing the object.

3. The information processing device according to claim 1, wherein the detection unit detects the background region by comparing the image and a range image that indicates a range corresponding to each pixel in the image.

4. The information processing device according to claim 1, wherein the recognition unit executes pattern recognition based on the calculated local feature amount and a predetermined parameter, and determines a partial region that includes a recognition target object from among multiple partial regions, and
wherein the predetermined parameter is learned using a local feature amount calculated based on the detection result of the detection unit for a learning sample.

5. The device apparatus according to claim 1, wherein the target object is a human body.

6. An apparatus for recognizing a target object in an image, comprising:
    a detection unit configured to detect a background region from the image including the target object,
    a region extraction unit configured to extract a partial region from the image,
    a dividing unit configured to divide the extracted partial region into multiple local regions;
    a setting unit configured to set each divided multiple local region as local regions for the partial region,
    a determination unit configured to determine whether each set local region is a candidate for the target object based on a result of detection by the detection unit,
    a replacement unit configured to perform a replacement process in which a pixel value of pixels positioned in a respective set local region is replaced with a predetermined value in a case that the determination unit determines that the set local region is not a candidate for the target object, and not to perform the replacement process in which a pixel value of pixels positioned in the set local region is replaced with a predetermined value in a case that the determination unit determines that the set local region is a candidate for the target object,
    a calculation unit configured to calculate a local feature amount from the set local region using at least the replaced pixel value, and
    a recognition unit configured to determine whether the partial region including the set local region includes the target object based on the calculated local feature amount.

7. The information processing device according to claim 6, wherein the detection unit detects the background region by comparing the image and a background model, which is an image not containing the object.

8. The information processing device according to claim 6, wherein the detection unit detects the background region by comparing the image and a range image that indicates a range corresponding to each pixel in the image.

9. The information processing device according to claim 6, wherein the recognition unit executes pattern recognition based on the calculated local feature amount and a predetermined parameter, and determines a partial region that includes a recognition target object from among multiple partial regions, and
wherein the predetermined parameter is learned using a local feature amount calculated based on the detection result of the detection unit for a learning sample.

10. The device according to claim 6, wherein the target object is a human body.

11. A recognition method for recognizing a target object in an image, comprising:
   detecting a background region from the image including the target object,
   extracting a partial region from the image,
   dividing the extracted partial region into multiple local regions,
   setting each divided multiple local region as local regions for the partial region,
   determining whether each set local region is a candidate for the target object based on a result of detection by the detection step,
   selecting a respective set local region in a case that the determination step determines that the set local region is a candidate for the target object, and not selecting the set local region in a case that the determination step determines that the set local region is not a candidate for the target object,
   calculating a local feature amount from the selected local region in the extracted-partial region, and
   determining whether the extracted partial region including the selected local region includes the target object based on the calculated local feature amount.

12. A recognition method for recognizing a target object in an image, comprising:
   detecting a background region from the image including the target object,
   extracting a partial region from the image,
   dividing the extracted partial region into multiple local regions;
   setting each divided multiple local region as local regions for the partial region,
   determining whether each set local region is a candidate for the target object based on a result of detection by the detection step,
   performing a replacement process in which a pixel value of pixels positioned in a respective set local region is replaced with a predetermined value in a case that the determination step determines that the set local region is not a candidate for the target object, and not performing the replacement process in which a pixel value of pixels positioned in the set region is replaced with a predetermined value in a case that the determination step determines that the set local region is a candidate for the target object,
   calculating a local feature amount from the set local region using at least the replaced pixel value, and
   determining whether the partial region including the set local region includes the target object based on the calculated local feature amount.

13. A non-transitory computer-readable storage medium storing a computer program for causing a computer to function as an apparatus for recognizing a target object in an image, the apparatus comprising:
   a detection unit configured to detect a background region from the image including the target object,
   a region extraction unit configured to extract a partial region from the image,
   a dividing unit configured to divide the extracted partial region into multiple local regions;
   a setting unit configured to set each divided multiple local region as local regions for the partial region,
   a determination unit configured to determine whether each set local region is a candidate for the target object based on a result of detection by the detection unit,
   a selection unit configured to select a respective set local region in a case that the determination unit determines that the set local region is a candidate for the target object, and not to select the set local region in a case that the determination unit determines that the set local region is not a candidate for the target object,
   a calculation unit configured to calculate a local feature amount from the selected local region in the extracted partial region, and
   a recognition unit configured to determine whether the extracted partial region including the selected local region includes the target object based on the calculated local feature amount.

14. A non-transitory computer-readable storage medium storing a computer program for causing a computer to function as an apparatus recognizing a target object in an image, the apparatus comprising:
   a detection unit configured to detect a background region from the image including the target object,
   a region extraction unit configured to extract a partial region from the image,
   a dividing unit configured to divide the extracted partial region into multiple local regions;
   a setting unit configured to set each divided multiple local region as local regions for the partial region,
   a determination unit configured to determine whether each set local region is a candidate for the target object based on a result of detection by the detection unit,
   a replacement unit configured to perform a replacement process in which a pixel value of pixels positioned in a respective set local region is replaced with a predetermined value in a case that the determination unit determines that the set local region is not a candidate for the target object, and not to perform the replacement process in which a pixel value of pixels positioned in the set local region is replaced with a predetermined value in a case that the determination unit determines that the set local region is a candidate for the target object,
   a calculation unit configured to calculate a local feature amount from the set local region using at least the replaced pixel value, and
   a recognition unit configured to determine whether the partial region including the set local region includes the target object based on the calculated local feature amount.

* * * * *